United States Patent
Chae et al.

(10) Patent No.: US 10,687,312 B2
(45) Date of Patent: Jun. 16, 2020

(54) SIGNAL TRANSMISSION METHOD AND DEVICE OF DEVICE TO DEVICE TERMINAL IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 353 days.

(21) Appl. No.: 15/522,893

(22) PCT Filed: Nov. 3, 2015

(86) PCT No.: PCT/KR2015/011711
§ 371 (c)(1),
(2) Date: Apr. 28, 2017

(87) PCT Pub. No.: WO2016/072705
PCT Pub. Date: May 12, 2016

(65) Prior Publication Data
US 2017/0339670 A1 Nov. 23, 2017

Related U.S. Application Data (60) Provisional application No. 62/075,871, filed on Nov. 5, 2014, provisional application No. 62/074,630, filed on Nov. 3, 2014.

(51) Int. Cl.
*H04W 72/02* (2009.01)
*H04W 72/04* (2009.01)
(Continued)

(52) U.S. Cl.
CPC ....... *H04W 72/02* (2013.01); *H04W 72/0446* (2013.01); *H04W 72/12* (2013.01);
(Continued)

(58) Field of Classification Search
None
See application file for complete search history.

(56) References Cited

U.S. PATENT DOCUMENTS

2012/0083283 A1* 4/2012 Phan ................ H04W 72/048
455/450
2014/0003262 A1* 1/2014 He .......................... H04W 4/70
370/252
(Continued)

FOREIGN PATENT DOCUMENTS

| CN | 102282901 A | 12/2011 |
|---|---|---|
| CN | 102334370 A | 1/2012 |
| CN | 103686753 A | 3/2014 |

OTHER PUBLICATIONS

"Discussion on resource allocation for D2D mode 2 communication", 3GPP TSG RAN WG1 Meeting #78, R1-143179, Agenda Item 7.2.3.2.1, LG Electronics, Dresden, Germany, Aug. 18,2014-Aug. 22, 2014 https://www.3gpp.org/DynaReport/TDocExMtg--R1-78--30657.htm (Year: 2014).*

(Continued)

*Primary Examiner* — Philip J Chea
*Assistant Examiner* — Hassan A Khan
(74) *Attorney, Agent, or Firm* — Birch, Stewart, Kolasch & Birch, LLP (57) ABSTRACT

One embodiment of the present invention provides a method by which a device to device (D2D) terminal transmits a signal in a wireless communication system, the D2D signal transmission method comprising the steps of: allowing a resource, which is to be used for D2D transmission, to be configured by a base station; and transmitting a D2D control (Continued)

signal by selecting a time frequency resource from the resource, wherein, when there is no data to be transmitted by the terminal, transmission of the D2D control signal is not permitted.

10 Claims, 8 Drawing Sheets

(51) Int. Cl.
*H04W 72/12* (2009.01)
*H04W 92/18* (2009.01)
*H04L 29/08* (2006.01)

(52) U.S. Cl.
CPC ....... *H04L 67/1061* (2013.01); *H04W 72/042* (2013.01); *H04W 72/0486* (2013.01); *H04W 92/18* (2013.01)

(56) References Cited

U.S. PATENT DOCUMENTS

| | | | | |
|---|---|---|---|---|
| 2014/0004867 A1* | 1/2014 | Noh | ...................... | H04W 76/14 455/450 |
| 2015/0264677 A1* | 9/2015 | He | ...................... | H04W 72/02 370/312 |
| 2015/0312960 A1* | 10/2015 | Kim | ...................... | H04W 72/04 370/329 |
| 2015/0327312 A1* | 11/2015 | Burbidge | .............. | H04W 72/14 370/329 |
| 2017/0006652 A1* | 1/2017 | Lee | ........................ | H04W 72/08 |
| 2017/0064733 A1* | 3/2017 | Lee | ........................ | H04W 76/14 |
| 2017/0105209 A1* | 4/2017 | Sorrentino | ........ | H04W 72/1289 |
| 2017/0188320 A1* | 6/2017 | Xiong | ................... | H04W 8/005 |

OTHER PUBLICATIONS

3rd Generation Partnership Project, "Technical Specification Group Radio Access Network; Study on LTE Device to Device Proximity Services; Radio Aspects (Release 12)," 3GPP TR 36.843, V12.0.1, Mar. 2014 (Mar. 27, 2014), pp. 1-50 (Total 52 pages).

Huawei et al., "Details of 1 Bit Resource Reservation Mechanism for Mode 2," 3GPP TSG RAN WG1 Meeting #78bis, R1-143915, Ljubljana, Slovenia, Oct. 6-10, 2014 (Sep. 27, 2014), 4 pages.

LG Electronics, "Discussion on Resource Allocation for D2D Mode 2 Communication," 3GPP TSG RAN WG1 Meeting #78, R1-143179, Dresden, Germany, Aug. 18-22, 2014 (Aug. 10, 2014), pp. 1-10.

Samsung, "Collision Avoidance Mechanism for Mode 2 Communication," 3GPP TSG RAN WG1 Meeting #78, R1-143080, Dresden, Germany, Aug. 18-22, 2014 (Aug. 10, 2014), 3 pages.

Ericsson, "Layer 2 Procedures for D2D Communication," 3GPP TSG-RAN WG2 #85bis, Tdoc R2-141256, Valencia, Spain, Mar. 31-Apr. 4, 2018 (Mar. 22, 2018), pp. 1/3-9/3, XP050817788.

LG Electronics, "Discussion on PD2DSCH Design," 3GPP TSG RAN WG1 Meeting #78, R1-143190, Dresden, Germany, Aug. 18-22, 2014 (Aug. 17, 2014), pp. 1-5, XP050788667.

\* cited by examiner

SIGNAL TRANSMISSION METHOD AND DEVICE OF DEVICE TO DEVICE TERMINAL IN WIRELESS COMMUNICATION SYSTEM

CROSS REFERENCE TO RELATED APPLICATIONS

This application is the National Phase of PCT International Application No. PCT/KR2015/011711, filed on Nov. 3, 2015, which claims priority under 35 U.S.C. 119(e) to U.S. Provisional Application No. 62/074,630, filed on Nov. 3, 2014 and No. 62/075,871, filed on Nov. 5, 2014, all of which are hereby expressly incorporated by reference into the present application.

TECHNICAL FIELD

Following description relates to a wireless communication system, and more particularly, to a method of transmitting a signal in device to device communication and an apparatus therefor.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that with the introduction of D2D communication will reduce the power consumption of devices participating in D2D communication, increase data transmission rates, increase the accommodation capability of a network, distribute load, and extend cell coverage.

DISCLOSURE OF THE INVENTION

Technical Task

A technical task of the present invention is to provide a method of transmitting such a D2D signal as a D2D control signal, a D2D communication signal, a synchronization signal, and the like, and items related to whether or not there is data to be transmitted and transmission of a D2D signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal, which is transmitted by a D2D (device to device) UE in a wireless communication system, includes the steps of being configured with resource to be used for D2D transmission from an eNB, and transmitting a D2D control signal by selecting a time-frequency resource from the resource. In this case, if the D2D UE has no data to transmit, transmission of the D2D control signal is not allowed.

To further achieve these and other advantages and in accordance with the purpose of the present invention, according to a different embodiment, a user equipment transmitting a D2D (device to device) signal in a wireless communication system includes a transmitter and a receiver, and a processor, the processor is configured with resource to be used for D2D transmission from an eNB, the processor configured to transmit a D2D control signal by selecting a time-frequency resource from the resource. In this case, if the UE has no data to transmit, transmission of the D2D control signal is not allowed.

If the D2D UE transmits the D2D control signal in a previous D2D control signal period, the transmission of the D2D control signal can be allowed during a prescribed time period, although the D2D UE has no data to transmit.

The prescribed time period may correspond to a time period lasting until a first timer is expired after the D2D control signal is transmitted in the previous control signal period.

The D2D UE can transmit a packet in the configured resource, although the D2D UE has no communication data to transmit.

If the communication data does not exist, packet transmission can be allowed for a time period until a second timer is expired only.

If a new D2D control signal period starts before the second timer is expired, the new D2D control signal period may not affect the progress of the second timer.

If a new D2D control signal period starts before the second timer is expired, the second timer can be reset.

If the D2D UE is in an RRC connected state and there is an indication of the eNB, the D2D UE transmitting the D2D control signal can transmit a D2D synchronization signal, although the D2D UE has no data to transmit.

If the D2D UE corresponds to a UE indicated to transmit a D2D synchronization signal when the D2D UE is in an idle state and a prescribed RSRP condition is satisfied, the D2D UE can transmit the D2D synchronization signal.

The D2D synchronization signal can be transmitted until a third timer is expired.

The D2D UE can transmit the D2D synchronization signal in a D2D measurement period, although the third timer is expired.

The D2D measurement period may correspond to a D2D measurement period closest from a timing at which the third timer is expired among a plurality of D2D measurement periods.

If the D2D UE has no communication data to transmit, the D2D UE may not transmit a packet in the configured resource.

Advantageous Effects

According to embodiments of the present invention, it is able to reduce unnecessary interference and efficiently transmit a D2D signal.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal. Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)". A base station can be used as a meaning indicating a scheduling node, a cluster head, and the like. If a base station or a relay transmits a signal transmitted by a terminal, the base station or the relay can be regarded as a terminal.

In the following, such a term as a cell is applied to such a transmission/reception point as a base station (eNB), a sector, a remote radio head (RRH), and the like. The cell can be used as a comprehensive term to identify a component carrier in a specific transmission/reception point.

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

Figure 1:
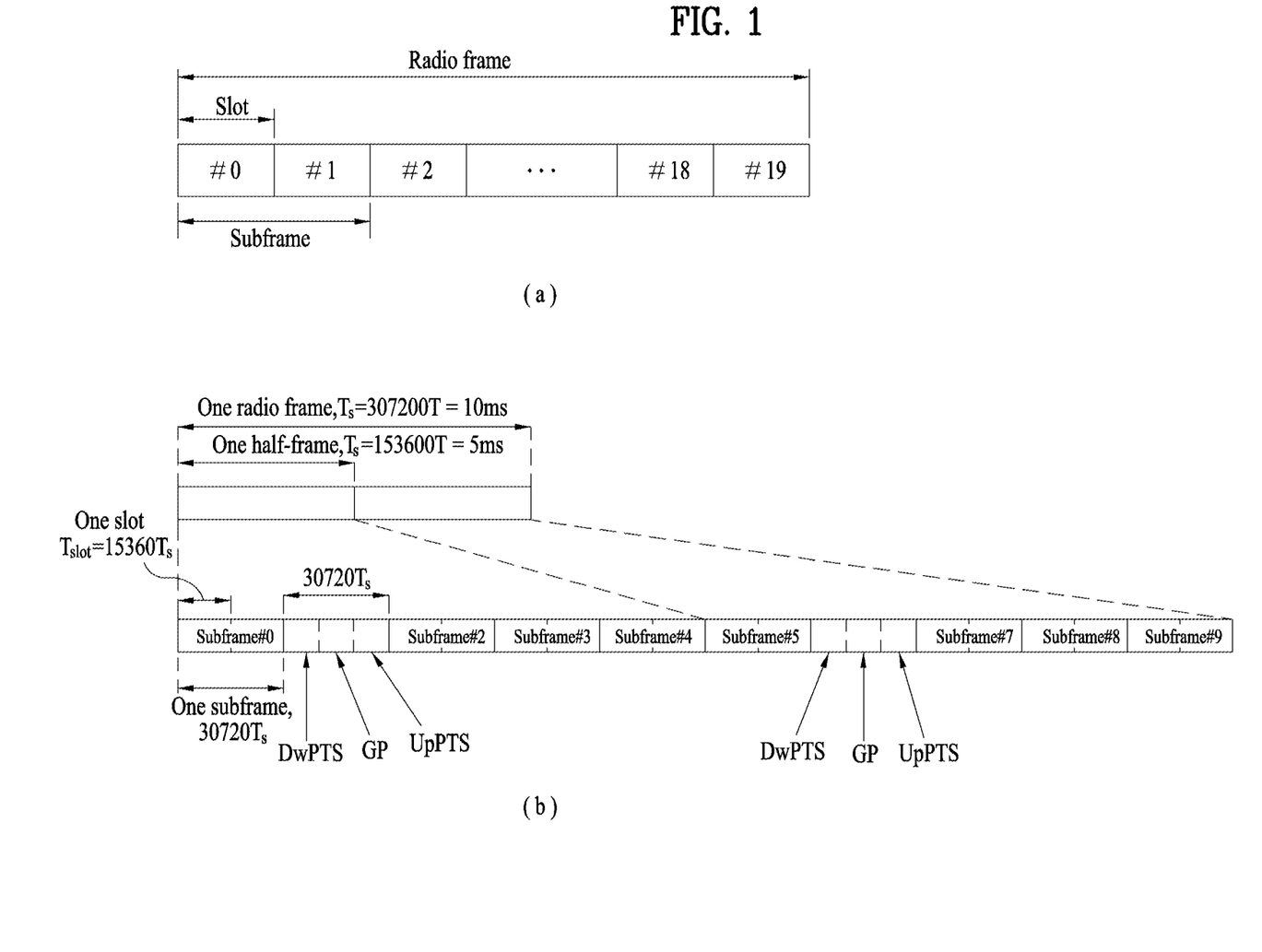
FIG. 1 is a diagram for a structure of a radio frame.

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

Figure 2:
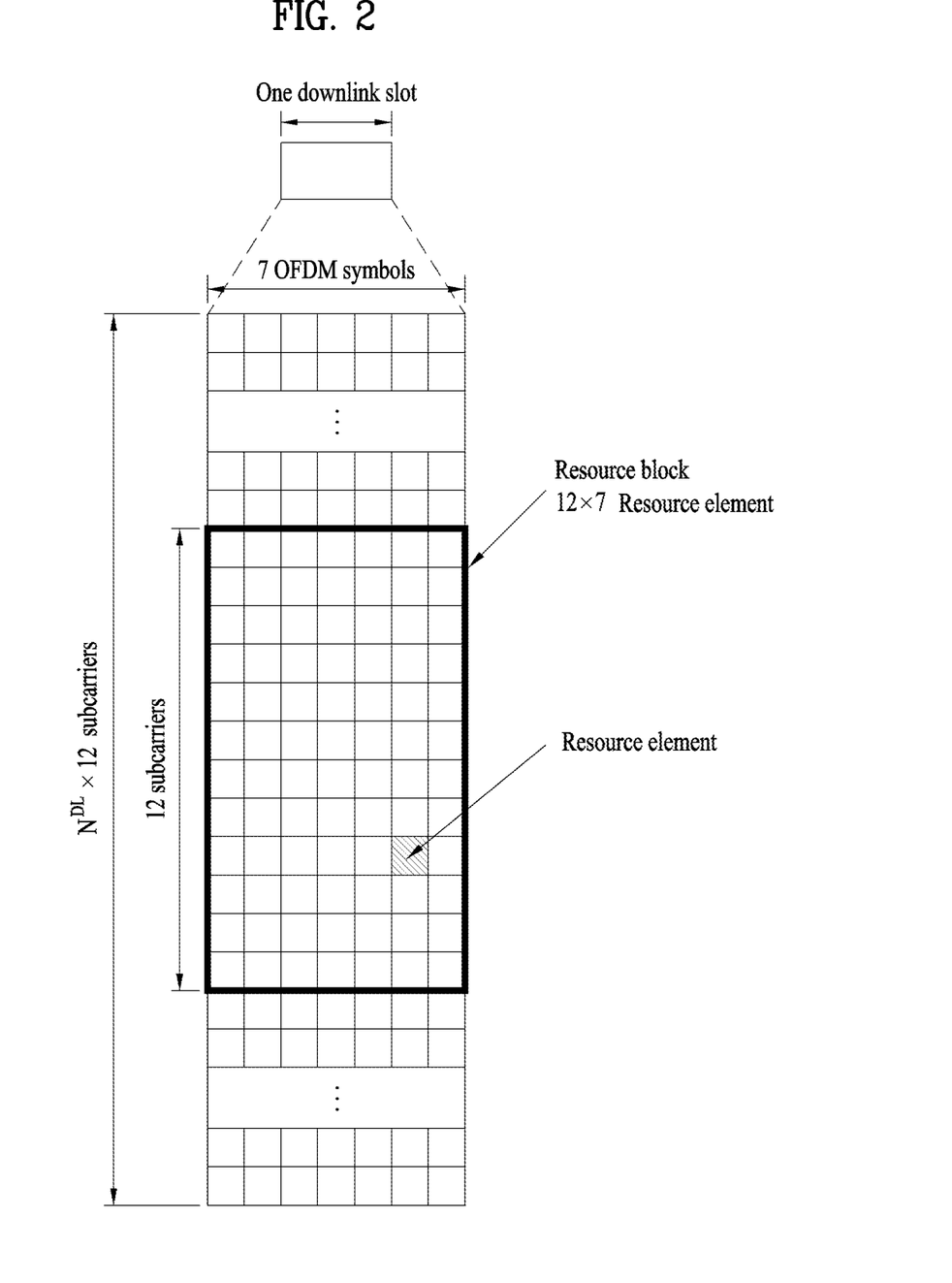
FIG. 2 is a diagram for a resource grid in a downlink slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
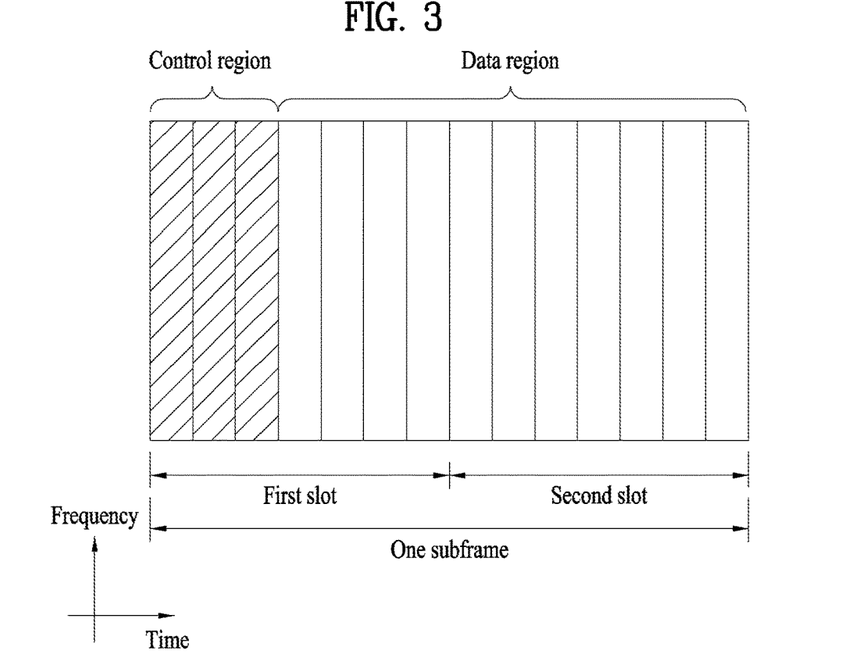
FIG. 3 is a diagram for a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
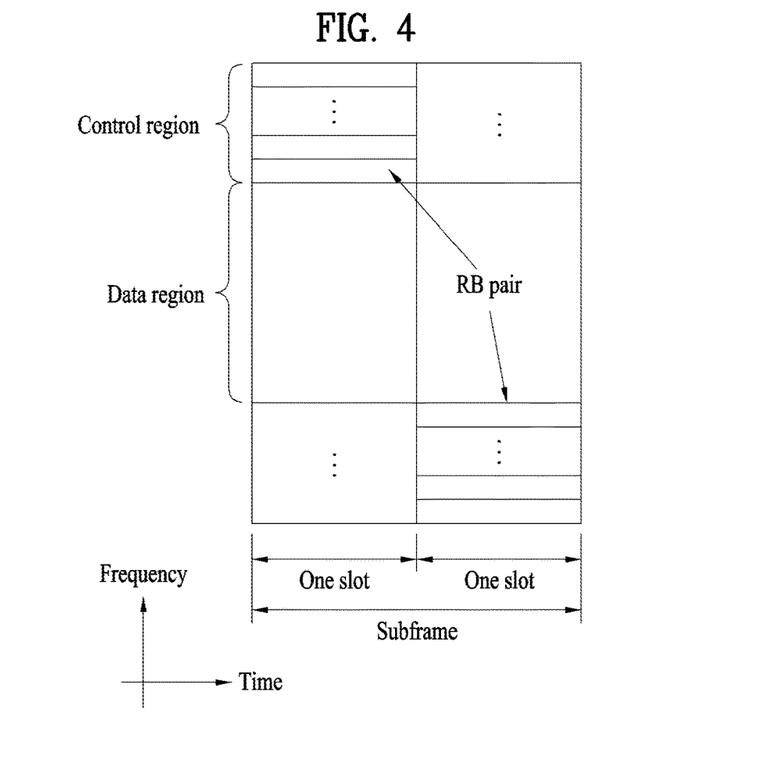
FIG. 4 is a diagram for a structure of an uplink subframe.

FIG. 4 illustrates a UL subframe structure. A UL subframe may be divided into a control region and a data region in the frequency domain. A physical uplink control channel (PDCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 5:
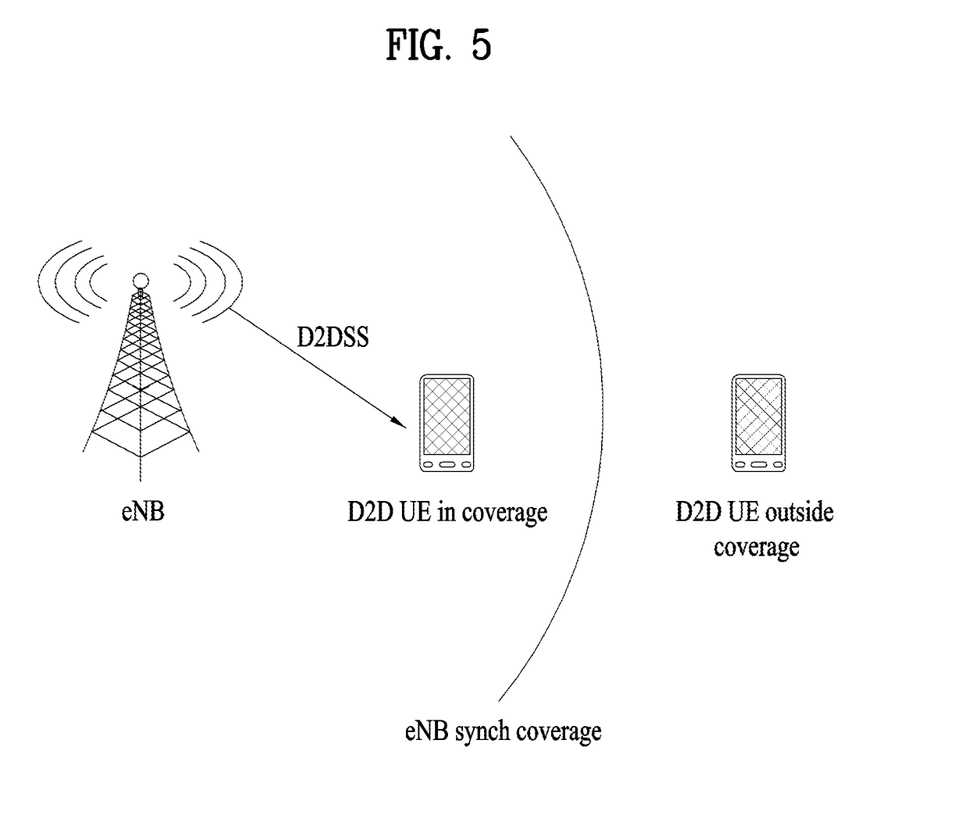
FIG. 5 is a diagram for explaining relaying of a synchronization signal.

In a situation illustrated in FIG. 5, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

Figure 6:
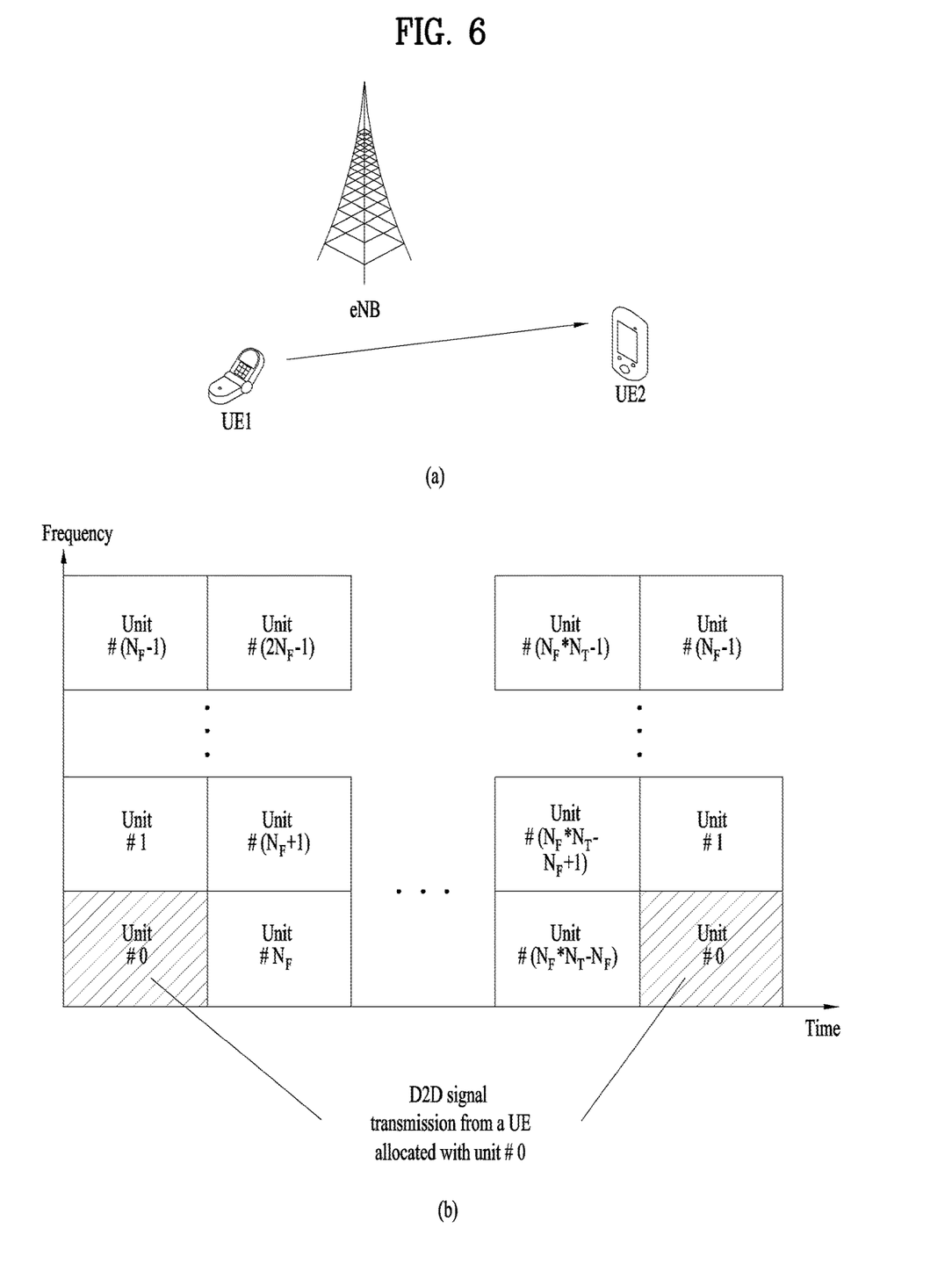
FIG. 6 is a diagram for explaining a resource pool.

FIG. 6 shows an example of a UE1, a UE2 and a resource pool used by the UE1 and the UE2 performing D2D communication. In FIG. 6 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 6 (b) shows an example of configuring a resource unit. Referring to FIG. 6 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 6, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA signal and a D2D data channel are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery signal may correspond to a resource pool for a message that enables a neighboring UE to discover a transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), and a signal format (e.g., number of symbols occupied by a D2D signal in a subframe, number of subframes used for transmitting a D2D signal). For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

In the following, transmission and reception of an SA, a communication signal, and the like according to embodiments of the present invention are explained based on the aforementioned description.

Transmission and Reception of SA

First of all, an SA signal transmitted and received in a mode 2 is explained. A mode 2 UE is configured with resource to be used for D2D transmission from an eNB. Or, a UE located at the out of coverage can receive a preconfigured resource pool to be used for D2D transmission. The UE selects a time-frequency resource from the resource pool to transmit an SA (D2D control signal, SCI (sidelink control information)) signal.

In this case, if the UE does not have data to transmit, transmission of the SA may not be allowed. In particular, in case of mode 2 SA, if there is no data to be transmitted, SA is not transmitted. If such a constraint does not exist, SA can be transmitted although there is no data to be transmitted. As a result, unnecessary interference may occur in a D2D system. In the aspect of a D2D reception UE, the D2D reception UE can receive D2D data according to SA only when the SA transmitted by a D2D UE, which has D2D data to be transmitted, is properly received. When UEs have no data to be transmitted, if most of the UEs transmit SA, the SA may works as interference to the D2D reception UE in listening to SA essential to the D2D reception UE. In case of a D2D transmission UE, although the D2D transmission UE does not have any data to be transmitted, if the D2D transmission UE transmits SA due to a half-duplex constraint, the D2D transmission UE may fail to listen to a different SA essential to the D2D transmission UE. The operation mentioned above can be performed to prevent a different UE from causing unnecessary interference or prevent a specific UE unnecessarily transmitting SA from receiving SA of a different UE by determining a rule of transmitting SA only when a data exists in the upcoming SA resource pool.

Figure 7:
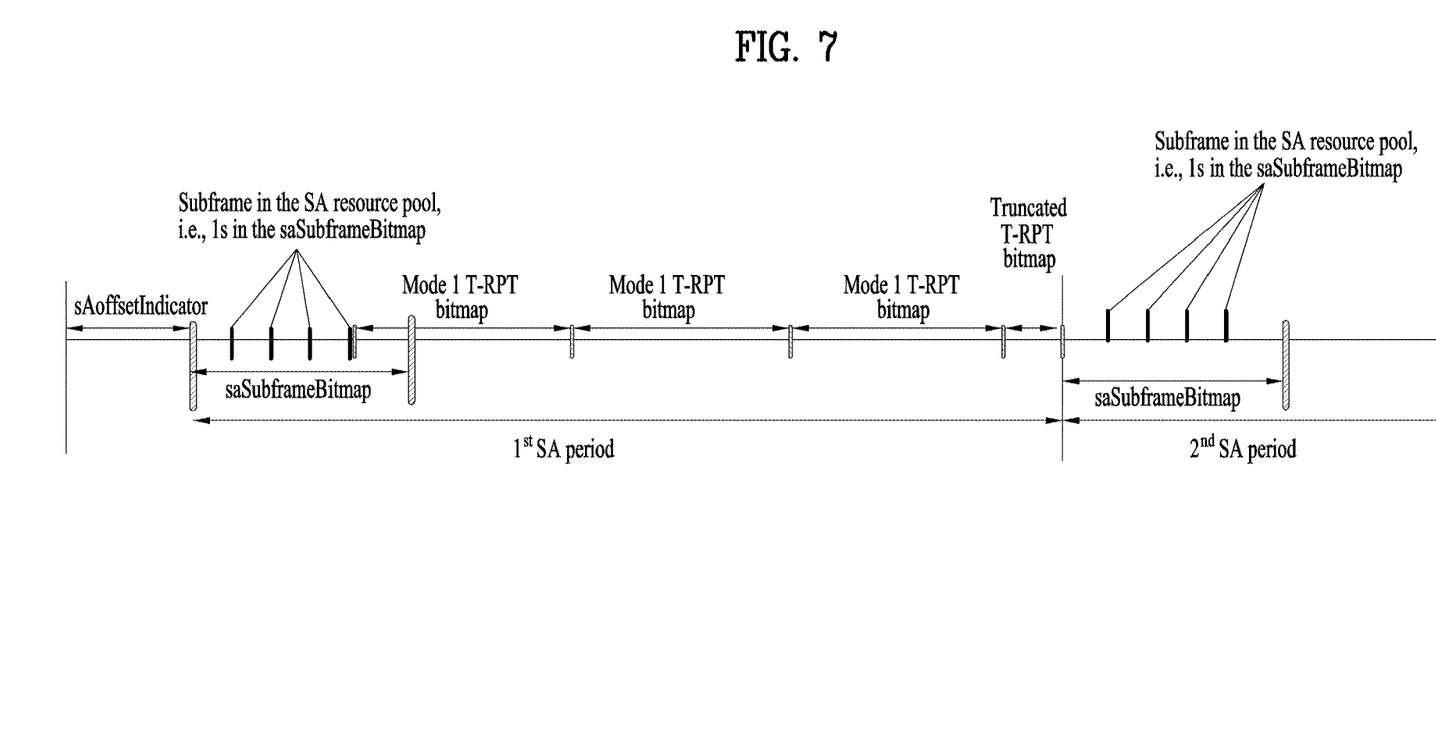
FIGS. 7 and 8 are diagrams for explaining one embodiment of the present invention.

If a UE transmits SA in a previous SA period (or a D2D control signal period), although the UE does not have data to transmit, it may allow the UE to transmit SA within a prescribed time. The SA period can be defined as FIG. 7. Referring to FIG. 7, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes.

Subsequently, the prescribed time may correspond to a time period lasting until a first timer is expired after SA is transmitted in a previous SA period. For example, referring to FIG. 7, if the first timer, which is operating after the SA resource pool is terminated in the first SA period, is not expired in a second SA period, it may be able to transmit SA, although there is no data to be transmitted. In particular, if a UE transmits SA in a previous period or has a history of transmitting SA with a certain period, the UE operates a timer after D2D data is transmitted. If the timer is within a prescribed threshold, the UE is allowed to transmit SA. By doing so, when a D2D data packet is generated between SA periods, a D2D Tx UE can secure a transmission resource in advance by transmitting SA in advance or transmitting SA during a prescribed time after the data is transmitted to reduce latency. The timer operation can be designated by the number of continuously transmitting SA in an SA period without data. For example, if the number of continuously transmitting SA without data is restricted to a number equal to or less than a prescribed number and a UE, which have transmitted D2D data in the past, transmits SA during a prescribed number of SA periods after D2D data transmission is terminated, it may be able to secure a resource in advance. The operation mentioned above corresponds to an exceptional operation of the operation of transmitting SA only when there is data to be transmitted. It may be able to allow a UE, which have recently transmitted data, to transmit SA without data during a prescribed time to obtain an effect of reducing latency at the time of transmitting additional data.

In case of mode 1, it may be able to configure a UE, which have received a D2D grant from an eNB or a scheduling node, to transmit SA. In this case, although a D2D Tx UE has no data to transmit, it may be able to configure the D2D Tx UE to transmit D2D SA all the time. Or, if a UE receives a D2D grant from an eNB or a different scheduling node and has data to transmit, it may be able to configure the UE to transmit SA all the time in a manner of being combined with the operation of the mode 2. In particular, in the mode 1, such an additional condition as "when a grant is received" is provided.

The operation of receiving a D2D grant and transmitting SA can be used as a meaning of checking whether or not an eNB transmits a D2D grant and checking whether or not a UE properly receives the D2D grant. In particular, if the eNB listens to the operation of the UE transmitting SA without separate ACK/NACK, the eNB is able to know whether or not the UE successfully receives the grant.

In some cases, when a D2D UE has no data to transmit, if the D2D UE is allowed to transmit SA, it may be able to reserve a resource. More specifically, if the D2D UE is allowed to transmit SA although the D2D UE has no data to transmit, a D2D backward link can be used for the usage of resource reservation. In this case, the backward link corresponds to a case that an Rx UE transmits a D2D signal in the aspect of a Tx UE when there is a pair of two D2D UEs (Tx UE and Tx UE). The reserve operation of the backward link is not restricted to the mode 1. The operation can be exceptionally permitted in the modes 2. When a D2D Tx UE intends to make a reservation for the D2D backward link, the D2D Tx UE transmits SA to make a reservation for a specific resource. For example, when the D2D Tx UE intends to make a reservation for the D2D backward link, if the D2D Tx UE uses a TA or an MCS field in a predetermined specific state, it can be comprehended as a meaning that the D2D Tx UE asks the D2D Rx UE to transmit data using a resource indicated by T-RPT of SA. This is just an example only. In the following, various methods capable of being used for informing D2D Rx UEs that a D2D Tx UE has no data to transmit are explained.

i) It may be able to add all zero state to T-RPT. It may be able to indicate T-RPT (time resource pattern for transmission) via SA to indicate that D2D data is transmitted in a specific subframe after SA is transmitted. In case of SA not transmitting actual data, it may be able to transmit T-RPT of all zero state to inform a D2D Rx UE of the SA not transmitting the actual data.

ii) It may use an unused state of MCS. It may be able to indicate MCS of D2D data via SA. In this case, it may be able to indicate SA not transmitting actual data using a partial unused state among states of an MCS field. For example, if D2D does not use 64QAM among the MCS fields of SA, one of the 64 QAM states is designated as coding rate=0 or no data state. Having received the MCS, UEs do not receive data interlocked with the SA.

iii) It may be able to differently configure CRC masking. A CRC mask of SA, which has D2D data to be transmitted, is configured in a manner of being different from a CRC mask of SA, which has no data to be transmitted, to inform a UE receiving the D2D data of the difference. For example, in case of the SA having the D2D data to be transmitted, a CRC is masked with a specific bit sequence.

iv) It may be able to use an unused state of TA field. For example, if a TA field of 6 bits is used for SA and granularity of each bit state corresponds to an extended CP, since 64*extended CP (16.9 us)*3*10^8/2 exceeds 100 km corresponding to a maximum cell radius supported by LTE, a part of states is not used. In this case, a specific unused state can be used for indicating SA which has no actual data.

v) A specific state of a frequency resource allocation field is used for indicating SA having no data. For example, among frequency resource allocation fields, since it is highly probable that a state of very big frequency resource amount used by D2D is not to be used for a D2D usage, the state is used for a different usage rather than RA (resource allocation) usage.

vi) If a D2D Tx UE does not have data to transmit, the D2D Tx UE can change an ID included in SA into a specific ID, which is transmitted when there is no data. In this case, the specific ID can be determined in advance or can be indicated by an eNB via physical layer signaling or higher layer signaling. Since the eNB is aware of the specific ID in advance, if the UE transmits SA of the ID, the eNB is able to recognize that the UE has no data anymore to transmit. Since the ID is not an ID indicated in advance, D2D reception UEs may not perform data decoding on the SA.

vii) If all or a part of the aforementioned fields are designated as a specific state and the fields are designated as a predetermined state, it may use a method for indicating that a corresponding SA corresponds to SA having no data. For example, if MCS is set to a state X, TA is set to a state Y, and T-RPT is set to a state Z, it may be able to indicate that a corresponding SA corresponds to SA having no data.

The method mentioned above can be used not only for SA indicating data but also for a different usage. In case of using the method for the different usage, it may be preferable to use a state value or a scheme different from a scheme of indicating the SA having no data.

Transmission and Reception of Communication Signal

In case of a D2D communication signal, it may use a scheme similar to the aforementioned SA. A D2D UE can be configured to transmit a D2D packet only when there is D2D data to be actually transmitted. In particular, if there is no data to be transmitted, the D2D UE does not perform D2D transmission in a corresponding resource. By doing so, it may be able to prevent an operation of causing interference due to unnecessary packet transmission. In this case, if there is data to be transmitted, it indicates that there is a safe packet capable of being transmitted via authorization or authentication in higher layer of 3GPP or other radio communication standard. In particular, it indicates that there is a safe packet, which has passed a security process of a certain level. The safe packet is defined to prevent a UE from transmitting randomly generated data without a permission of higher layer.

As an exceptional case, in order to make a different UE stably perform interference measurement, although a UE has no communication data to transmit, the UE can transmit a packet in a configured resource. In particular, although there is no data, a D2D resource indicated by SA may transmit a packet. By doing so, although there is no data to be actually transmitted, a UE may transmit zero padding or higher layer information indicating no data in a corresponding SA period to make other UEs predict potential interference in a next SA period and stably perform CSI measurement. This operation should be discreetly performed. The operation may correspond to an operation exceptionally permitted for a prescribed time only after data is most recently transmitted.

More specifically, although there is no data at the time of transmitting SA, an operation of performing transmission for a prescribed time by setting a second timer can be applied at the time of transmitting data. When there is no communication data, packet transmission can be permitted until the second timer is expired only. Whether to apply the aforementioned scheme may vary depending on a mode. For example, although there is no data to be actually transmitted after data is transmitted, it may be able to transmit a data packet for a prescribed time by operating a timer. In particular, data is transmitted for a prescribed time only instead of always transmitting a packet although there is no data to be transmitted. A specific D2D UE transmits data although there is no data to be transmitted for a very small part of a time period. By doing so, a neighboring D2D UE is able to stably estimate interference. And, if a partial resource is reserved, a transmission UE plays a role in occupying the resource to make a different UE not to use the resource when data is generated again. In case of performing the operation of transmitting data for a prescribed time by operating a timer although there is no data to be transmitted, the timer can be configured to be identical to the timer of SA or can be configured to be different from the timer of SA. In this case, in case of transmitting data again, the timer can be reset immediately or can be reset only when the data is continuously transmitted for a prescribed time.

Meanwhile, it may consider a scheme of transmitting data only without transmitting SA. According to the scheme, if resource allocation of SA, which is transmitted in a previous SA period, is not changed, data can be transmitted only without any separate SA transmission in a corresponding SA resource pool period. This scheme can be used for transmitting data when a resource allocation indication of a specific SA resource region is applied over a plurality of SA periods. Similarly, if there is no data to be transmitted, data transmission can be terminated. As an exceptional case, a UE, which have recently transmitted data, transmits zero padding dummy data for a prescribed time to preferentially occupy a resource or make a different UE easily measure interference.

If a new SA period starts before the second timer is expired, the new SA period may not affect the progress of the second timer. When the new SA period starts, if data is consistently transmitted although there is no data to be actually transmitted, the timer is constantly applied without resetting the timer. In particular, in case of consistently transmitting data without data irrespective of an SA period, it may be able to continuously apply the timer.

Or, if a new SA period starts before the second timer is expired, the second timer can be reset. If the new SA period starts, the timer is reset to apply the timer to data transmission when there is no data to be actually transmitted.

Or, when a new SA period starts, if SA corresponds to SA for transmitting data without data, a data timer is not reset. If the SA has data to transmit, the timer can be reset.

In the mode 1 and 2, one of the aforementioned SA and the data transmission method can be used. The mode 1 and the mode 2 can use a different method. For example, in the mode 1, since a resource is transmitted by an eNB, data is transmitted all the time. In the mode 2, a data packet is not transmitted according to whether or not there is a data to be transmitted or a timer is operated to transmit a packet for a prescribed time.

Meanwhile, an operation of making a reservation for a backward link after the SA is transmitted, an operation of transmitting SA without data, an operation of transmitting data without SA transmission, and an operation of applying resource allocation of SA to a plurality of SA periods can be extensively applied to V2X (vehicle to anything). For example, in case of transmitting a UE of high priority or data of a big packet size, if SA is exceptionally transmitted in advance to preoccupy a resource or SA is transmitted one time to reduce a burden of frequently transmitting the SA, the SA can be used for the usage of maintaining a corresponding resource allocation for a prescribed time.

Transmission of D2D Synchronization Signal

Subsequently, transmission of a D2D synchronization signal is explained. Contents described in the following can be used together with at least one of the SA transmission method and the communication signal transmission method or can be independently used.

Table 1 in the following shows contents related to a D2DSS transmission operation in 3GPP RAN1#78bis.

---

For in-coverage UEs,
— A maximum of 1 D2DSS resource (comprising a periodically occurring subframe in which D2DSS may be transmitted if the conditions below are satisfied (note that the eNB may reuse resources which are not used for D2DSS transmission)) can be configured per cell for in coverage UEs
The D2DSS resource periodicity is:
The same for in-coverage and out-of-coverage
Fixed to 40 ms in the specifications
The D2DSS resource can be configured with a time offset with a granularity of 1 subframe
The D2DSS resource offset of neighbour cells can be signalled in a SIB w.r.t. SFN#0 of the serving cell with a granularity of 1 subframe
— For a UE transmitting SA or D2D data, in each subframe in the D2DSS resource, the UE shall transmit D2DSS if:
the subframe does not conflict with cellular transmission from the UE perspective, AND
FFS other defined conditions, including e.g. UE capability, are satisfied, AND
the subframe is within the SA or D2D data period in which SA or data is transmitted, AND
the UE is RRC_Connected and the eNB has instructed it (by dedicated signalling) to start D2DSS transmission, AND/OR FFS other condition(s) are satisfied if the UE is not transmitting SA or D2D data within the SA/data period in which the subframe falls OR all of the following conditions are satisfied:
an RSRP threshold for communication D2DSS transmission is configured, AND
if configured, the threshold is configured using SIB
the threshold can take values {−infinity, −115 ... − 60 (increments of 5), +infinity}dBm
the RSRP value of the UE is less than the threshold, AND
the eNB has not instructed the UE (by dedicated signalling) to stop D2DSS transmission.
— For a discovery UE, for each discovery pool, the UE shall transmit D2DSS in the first subframe of the discovery pool if this subframe is in the D2DSS resource, or otherwise in the latest subframe of the D2DSS resource before the start of the discovery pool, if:
the subframe does not conflict with cellular transmission from the UE perspective, AND
FFS: the UE is not scanning for other D2DSS (details FFS), AND
FFS other defined conditions, including e.g. UE capability, are satisfied, AND
the UE transmits a discovery message in the discovery pool, AND the UE is RRC_Connected and the eNB has instructed it (by dedicated signalling) to start D2DSS transmission, OR all of the following conditions are satisfied:
- an RSRP threshold for discovery D2DSS transmission is configured, AND
  - if configured, the threshold is configured using SIB
  - the threshold can take values {infinity, −115 ... −60 (increments of 5), +infinity}dBm
  the RSRP value of the UE is less than the threshold, AND
  the eNB has not instructed the UE (by dedicated signalling) to stop D2DSS transmission.
Out-of-coverage UEs do not transmit D2DSS on more than 1 D2DSS resource
— 2 D2DSS resources are used for out-of-coverage
  FFS whether the locations are preconfigured, signalled or fixed in the spec w.r.t. DFN#0

According to the contents of Table 1, among UEs transmitting D2D data or D2D discovery, a UE indicated by an eNB or a UE satisfying an RSRP condition configured by the eNB can transmit a D2DSS. Moreover, a UE not transmitting data or discovery can transmit a D2DSS according to the schemes described in the following. By doing so, D2D reception UEs can stably perform reception and measurement. More specifically, although a D2D signal is not transmitted due to the small number of UEs capable of transmitting a D2DSS in a network, if an eNB indicates a specific UE (D2D capable) to transmit a D2DSS, the specific UE can transmit the D2DSS. Whether to perform transmission in a specific resource is determined based on probability in a D2D discovery resource region. In this case, if it is determined not to perform discovery in a specific resource region, weather to transmit a D2DSS can be ambiguous. In case of a D2D communication UE, whether or not a specific UE has a packet is dynamically changed, whether or not a D2DSS is transmitted can also be changed. In this case, if the D2DSS is unstably received, UEs measuring the D2DSS are unable to stably measure the D2DSS. In this case, reception UEs can stably measure the D2DSS.

If a UE is in RRC connected state and there is an indication of an eNB, although the UE has no data to transmit (e.g., although discovery or communication packet is not transmitted), a UE transmitting SA can transmit a D2DSS.

When a UE is in idle state and satisfies a prescribed RSRP condition, if the UE corresponds to a UE indicated to transmit a D2DSS, the UE can transmit the D2DSS. Among RRC idle UEs (or UEs changed to an RRC idle state from an RRC connected state by the indication of an eNB) satisfying the RSRP condition, a UE indicated to transmit a D2DSS can transmit the D2DSS although a discovery or a communication packet is not transmitted. In this case, if a UE is indicated (by the eNB) to transmit a D2DSS when the RSRP condition is satisfied or a UE is indicated to transmit a D2DSS from the eNB, the UE operates a timer and can be configured to consistently transmit the D2DSS for a prescribed time.

A D2DSS can be transmitted until a third timer is expired. Although the third timer is expired, a UE can transmit a D2DSS in a D2D measurement period. In this case, the D2D measurement period may correspond to a period closest from a timing at which the third timer is expired among a plurality of D2D measurement periods. When D2DSS transmission is performed based on a timer, if the timer is expired or a D2D data packet is not transmitted, the D2DSS transmission can be terminated. In this case, a D2DSS measurement period can be defined. A D2DSS transmission UE can be configured to consistently transmit a D2DSS in the D2DSS measurement period. For example, the D2DSS measurement period, which is configured to consistently transmit a D2DSS, may correspond to a closest D2DSS measurement period after the D2DSS transmission is terminated or a D2DSS measurement period of a prescribed period from the closest D2DSS measurement period. Regarding this, it is explained in more detail with reference to FIG. 8 in the following.

Figure 8:
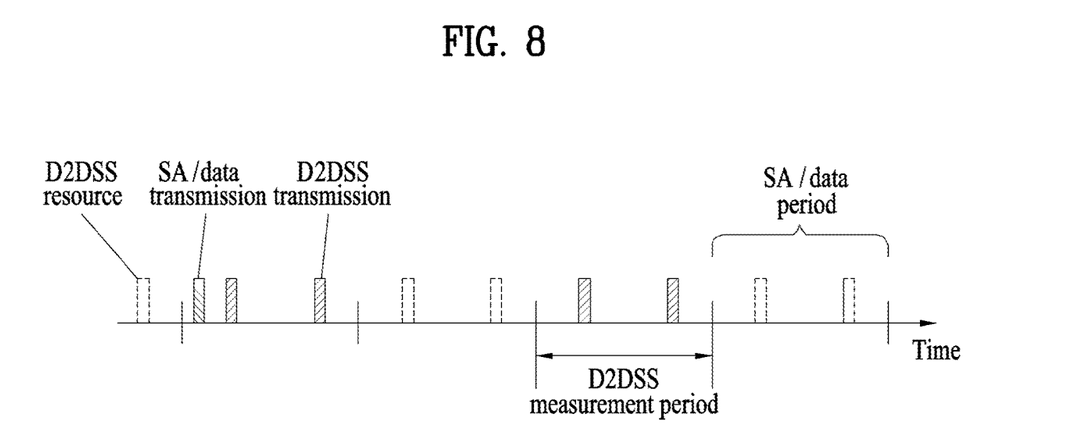

FIG. 8 shows an embodiment of transmitting a D2DSS in a closest D2DSS measurement period after D2DSS transmission. In this case, the D2DSS measurement period corresponds to a period used for UEs measuring a D2DSS to measure strength or quality of the D2DSS (or PD2DSCH transmitted together with the D2DSS) and determine whether or not the D2DSS becomes a synchronization source, whether or not the D2DSS is selected/reselected, and the like. The D2DSS measurement period can be used for out coverage UEs to measure D2DSSs of in-coverage UEs. And, the D2DSS measurement period can be used for D2DSS reception UEs to measure signal strength/quality of a D2DSS. Duration, a period, an (SFN and/or subframe) offset, and the like of the D2DSS measurement period can be determined in advance or can be configured by an eNB via physical layer signaling or higher layer signaling. The out coverage UEs may use a predetermined area or a period signaled by the in coverage UEs via physical layer signaling or higher layer signaling as the D2D measurement period. For example, information on the measurement period can be signaled by the in coverage UEs via PD2DSCH. If a D2DSS is transmitted in a period in which D2DSS reception UEs perform measurement, the reception UEs may not have an incorrect or a considerably changing D2DSS measurement value (i.e., the reception UEs may have a stable measurement value).

Meanwhile, in order to measure a D2DSS signal of a different D2D UE or a UE group not matched with a D2DSS signal of a D2D UE or in order to measure a D2DSS of a different D2D UE far from the D2D UE, it may be able to prohibit the transmission of a D2D signal. A period during which the transmission of the D2D signal is prohibited is referred as a D2D silent period. A D2D measurement period and the D2D silent period can be matched with each other or can be managed separately. For example, if the D2DSS measurement period is matched with the D2DSS silent period, a UE receiving a D2DSS in a corresponding region does not transmit a different D2D signal in the D2DSS measurement period. In this case, as an exceptional case, D2DSS transmission can be permitted. The reason why the exceptional case exists in D2DSS is to make a UE measuring the D2DSS transmitted by the UE stably measure or receive the D2DSS. If the D2D measurement period and the D2D silent period are separately managed, duration, a period, an (SFN and/or subframe) offset, and the like for each period can be individually determined in advance or information on each period can be signaled to a different UE via PD2DSCH.

Besides, a UE not transmitting data or discovery does not transmit a D2DSS. In particular, when the UE does not transmit D2D data or discovery, if D2DSS transmission is permitted, among PUSCH resources, center 6 RBs in which a D2DSS is transmitted can be considerably interfered. In order to prevent this, it may be able to prohibit indiscreet D2DSS transmission of the UE not transmitting data or discovery.

Meanwhile, since a period of the discovery is very long, the discovery may have a period (e.g., 1 sec) much longer than a period (e.g., 40 ms) of a D2DSS resource region. In this case, it is preferable to allow a UE configured to transmit the discovery only to transmit a D2DSS in a partial D2DSS transmission resource only before a discovery period (or after a discovery period, or a D2DSS transmission resource between discover resource pools) rather than all D2D resource regions. In particular, it is preferable to allow a UE configured to transmit a D2DSS without the discovery to transmit a D2DSS in a resource (a D2DSS transmission resource determined in advance or a D2DSS transmission resource configured by a network) only near a discovery resource pool.

In case of an out coverage UE, it is preferable to configure the UE to transmit a D2DSS only when a D2DSS transmission condition (a case that a D2DSS having signal strength/quality of a prescribed level does not exist in the vicinity of the UE or a case of relaying a D2DSS transmitted by a neighboring UE) is satisfied unless a D2DSS transmission prohibition signal or a transmission restriction signal (e.g., the D2DSS silent period) is received from an in coverage UE.

Since it is able to include the examples for the proposed method as one of implementation methods of the present invention, it is apparent that the examples are considered as a sort of proposed methods. Although the embodiments of the present invention can be independently implemented, the embodiments can also be implemented in a combined/aggregated form of a part of embodiments. An eNB can inform a UE of information on the rules of the proposed methods of the present invention or information on whether or not the rules are applied through a predefined signal (e.g., a physical layer or higher layer signal).

Configurations of Devices for Embodiments of the Present Invention

Figure 9:
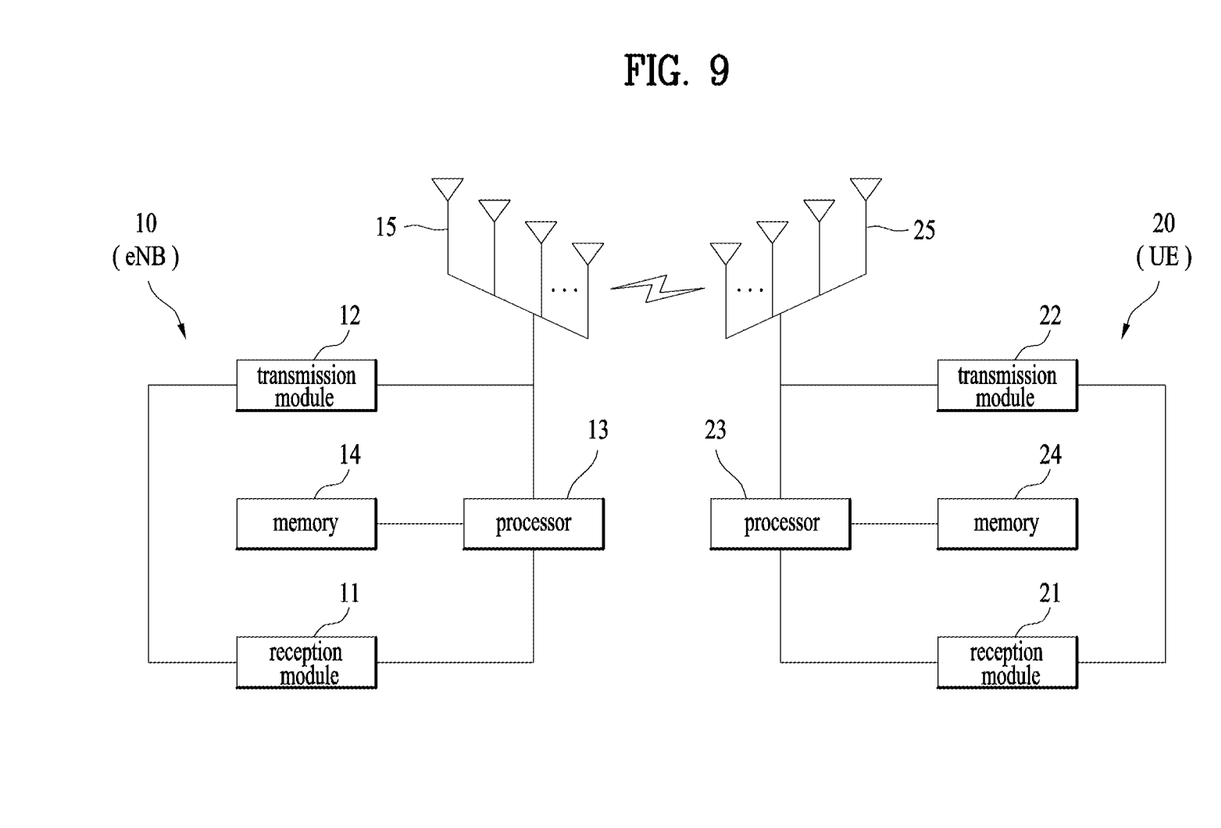
FIG. 9 is a diagram for configurations of a transmitter and a receiver.

FIG. 9 is a diagram illustrating configuration of a transmit point apparatus and a UE according to one embodiment of the present invention.

Referring to FIG. 9, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 9, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 9 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to various mobile communication systems.

What is claimed is:

1. A method of transmitting a signal, which is transmitted by a D2D (device to device) User Equipment (UE) in a wireless communication system, the method comprising:
being configured with a resource pool to be used for D2D transmission from an evolved base station (eNB); and
selecting a time-frequency resource for a PSCCH (physical sidelink control channel) from the resource pool; and
transmitting the PSCCH within a first control period based on whether a first timer is run or whether there is data to be transmitted by the D2D UE,
wherein the PSCCH includes resource allocation information to which the data is to be transmitted and information on a MCS (modulation and coding scheme),
wherein when there is data to be transmitted by the D2D UE, the PSCCH is transmitted regardless of whether the first timer is running,
wherein when there is no data to be transmitted by the D2D UE, the PSCCH is transmitted only while the first timer is running, and
wherein the first timer is run when another PSCCH is transmitted based on a presence of data to be transmitted by the D2D UE in a second control period immediately before the first control period.

2. The method of claim 1, wherein the first timer is reset when the PSCCH is transmitted in a presence of data to be transmitted by the UE.

3. The method of claim 1, wherein if a new control period starts before the first timer is expired, the new control period does not affect the progress of the first timer.

4. The method of claim 1, wherein if the D2D UE is in a Radio Resource Control (RRC) connected state and there is an indication of the eNB, the D2D UE transmitting the PSCCH transmits a D2D synchronization signal, although the D2D UE has no data to transmit.

5. The method of claim 1, wherein if the D2D UE corresponds to a UE indicated to transmit a D2D synchronization signal when the D2D UE is in an idle state and a prescribed Reference Signal Received Power (RSRP) condition is satisfied, the D2D UE transmits the D2D synchronization signal.

6. The method of claim 5, wherein the D2D synchronization signal is transmitted until a second timer is expired.

7. The method of claim 6, wherein the D2D UE transmits the D2D synchronization signal in a D2D measurement period, although the second timer is expired.

8. The method of claim 7, wherein the D2D measurement period corresponds to a D2D measurement period closest from a timing at which the second timer is expired among a plurality of D2D measurement periods.

9. The method of claim 1, wherein if the D2D UE has no communication data to transmit, the D2D UE does not transmit a packet in the configured resource.

10. A user equipment transmitting a D2D (device to device) signal in a wireless communication system, the user equipment comprising:
a transmitter and a receiver; and
a processor,
the processor being configured with a resource pool to be used for D2D transmission from an evolved base station (eNB),
the processor selecting a time-frequency resource for a PSCCH (physical sidelink control channel) from the resource pool, and
the processor transmitting the PSCCH within a first control period based on whether a first timer is run or whether there is data to be transmitted by the D2D UE,
wherein the PSCCH includes resource allocation information to which the data is to be transmitted and information on a MCS (modulation and coding scheme),
wherein when there is data to be transmitted by the D2D UE, the PSCCH is transmitted regardless of whether the first timer is running,
wherein when there is no data to be transmitted by the D2D UE, the PSCCH is transmitted only while the first timer is running, and
wherein the first timer is run when another PSCCH is transmitted based on a presence of data to be transmitted by the D2D UE in a second control period immediately before the first control period.

* * * * *